US011376901B2

(12) United States Patent
Suzuki et al.

(10) Patent No.: US 11,376,901 B2
(45) Date of Patent: *Jul. 5, 2022

(54) ROAD SURFACE CONDITION DETERMINATION DEVICE PERFORMING SENSING BASED ON DIFFERENT SENSING CONDITIONS

(71) Applicant: DENSO CORPORATION, Kariya (JP)

(72) Inventors: Yoichiro Suzuki, Nisshin (JP); Masashi Mori, Kariya (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,434

(22) Filed: Aug. 28, 2020

(65) Prior Publication Data
US 2020/0391559 A1 Dec. 17, 2020

Related U.S. Application Data

(63) Continuation of application No. PCT/JP2019/007568, filed on Feb. 27, 2019.

(30) Foreign Application Priority Data

Mar. 2, 2018 (JP) .............................. JP2018-037766

(51) Int. Cl.
  *B60C 23/06* (2006.01)
  *B60C 23/04* (2006.01)
  *B60W 40/06* (2012.01)
(52) U.S. Cl.
  CPC ........ *B60C 23/065* (2013.01); *B60C 23/0477* (2013.01); *B60W 40/06* (2013.01); *B60C 23/062* (2013.01)

(58) Field of Classification Search
  CPC ............ B60C 23/0408; B60C 23/0496; B60C 23/061; B60C 23/0494; B60C 23/0416;
  (Continued)

(56) References Cited

U.S. PATENT DOCUMENTS

2015/0210286 A1    7/2015  Hanatsuka et al.
2016/0368501 A1*  12/2016  Suzuki ................. B60W 40/06
(Continued)

FOREIGN PATENT DOCUMENTS

JP         2014035279 A    2/2014
JP          201451195 A    3/2014
(Continued)

*Primary Examiner* — Andre J Allen
(74) *Attorney, Agent, or Firm* — Harness, Dickey & Pierce, P.L.C.

(57) ABSTRACT

A tire side device is provided with a vibration detection unit that outputs a detection signal corresponding to the magnitude of tire vibration, a control unit that performs to generate road surface data indicating a road surface condition that appears in the waveform of the detection signal, and a first data communication unit that transmits the road surface data. Furthermore, a vehicle body side system is provided with a second data communication unit that receives the road surface data transmitted from the first data communication unit, and a road surface determination unit that determines the condition of the road surface that the vehicle is traveling on the basis of the road surface data. In addition, sensing is performed by the control unit under different sensing conditions at the tire side device of at least one tire among a plurality of tires and the tire side device of at least one other tire among the plurality of tires, and road surface data generated on the basis of the different sensing conditions is transmitted from the first data communication unit.

13 Claims, 6 Drawing Sheets

(58) Field of Classification Search
CPC . B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0476; B60C 25/132; B60C 23/0437; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 23/04985; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; B60W 2510/0604; B60W 2510/222; B60W 2510/225; B60W 2520/40; B60W 2552/50; B60W 2554/80; B60W 2710/025; B60W 2710/08; B60W 2710/223; B60W 2720/18; B60W 30/18009; B60W 40/103; B60W 10/026; B60W 10/16; B60W 20/13; B60W 20/15; B60W 20/30; B60W 20/50; B60W 2050/0021; B60W 2050/0072; B60W 2050/0083; B60W 2420/60; B60W 2422/50; B60W 2422/80; B60W 2510/0208; B60W 2510/0647; B60W 2510/08; B60W 2510/081; B60W 2510/30; B60W 2530/18; B60W 2540/215; B60W 2556/05; B60W 2710/0616; B60W 2710/205; B60W 2720/16; B60W 30/04; B60W 30/18054; B60W 50/02; B60W 50/038; B60W 50/045; B60W 50/06; B60W 50/085; B60W 50/087; B60W 60/0011; B60W 10/101; B60W 10/107; B60W 10/12; B60W 10/182; B60W 10/188; B60W 10/30; B60W 20/12; B60W 20/19; B60W 2040/0827; B60W 2040/1323; B60W 2040/1384; B60W 2050/001; B60W 2050/0011; B60W 2050/0035; B60W 2050/0042; B60W 2050/0086; B60W 2050/0095; B60W 2050/021; B60W 2050/022; B60W 2050/0292; B60W 2050/0295; B60W 2300/14; B60W 2300/345; B60W 2300/367; B60W 2300/44; B60W 2510/0233; B60W 2510/0291; B60W 2510/0623; B60W 2510/0642; B60W 2510/0676; B60W 2510/082; B60W 2510/1045; B60W 2510/125; B60W 2510/184; B60W 2510/188; B60W 2510/246; B60W 2540/00; B60W 2540/06; B60W 2540/106; B60W 2540/21; B60W 2540/225; B60W 2552/25; B60W 2554/20; B60W 2554/4029; B60W 2554/4042; B60W 2554/406; B60W 2554/408; B60W 2555/40; B60W 2710/022; B60W 2710/024; B60W 2710/0627; B60W 2710/1038; B60W 2710/1061; B60W 2710/125; B60W 2710/242; B60W 2720/20; B60W 2720/263; B60W 30/165; B60W 30/18018; B60W 30/18036; B60W 30/186; B60W 30/1884; B60W 30/19; B60W 50/12; B60W 60/00; B60W 60/0016; B60W 60/0018; B60W 60/00184; B60W 60/0027; B60W 60/0054; B60W 60/0057; B60W 60/005

See application file for complete search history.

(56)  References Cited

U.S. PATENT DOCUMENTS

2019/0047556 A1    2/2019  Mori et al.
2020/0319020 A1*  10/2020  Sanji ..................... B60C 99/00

FOREIGN PATENT DOCUMENTS

| JP | 2017144975 A | 8/2017 | |
| WO | WO-2018199262 A1 * | 11/2018 | ............. G01P 15/00 |
| WO | WO-2019088024 A1 * | 5/2019 | ............. B60C 19/00 |
| WO | WO-2019093437 A1 * | 5/2019 | ............. B60W 40/06 |
| WO | WO-2019151415 A1 * | 8/2019 | ............. G08C 19/00 |
| WO | WO-2021045050 A1 * | 3/2021 | ............. B60C 19/00 |

* cited by examiner

GROUND CONTACT SURFACE

ROAD SURFACE CONDITION DETERMINATION DEVICE PERFORMING SENSING BASED ON DIFFERENT SENSING CONDITIONS

CROSS REFERENCE TO RELATED APPLICATION

The present application is a continuation application of International Patent Application No. PCT/JP2019/007568 filed on Feb. 27, 2019, which designated the United States and claims the benefit of priority from Japanese Patent Application No. 2018-037766 filed on Mar. 2, 2018. The entire disclosures of all of the above applications are incorporated herein by reference.

FIELD

The present disclosure relates to a road surface condition determination device which detects by tire side devices vibration received by each of tires, generates road surface data representing a road surface condition based on vibration data, transmits the road surface data to a vehicle body side system, and determines the road surface condition based on the road surface data.

BACKGROUND

A conventional road surface condition determination device includes an acceleration sensor attached to a back surface of a tire tread to detect a vibration applied to the tire, and estimates a road surface condition based on a detection result of the vibration. This road surface condition determination device estimates the road surface condition by generating data representing a road surface condition based on a vibration waveform of the tire detected by the acceleration sensor and transmitting the data of each road wheel to a vehicle body side receiver and the like.

SUMMARY

According to the present disclosure, a road surface condition determination device comprises a tire side device attached to each of a plurality of tires of a vehicle, and a vehicle body side system provided in a vehicle body. The tire side device includes a vibration detection unit configured to output a detection signal corresponding to a magnitude of vibration of the tire, a control unit configured to perform a sensing that generates road surface data indicating a road surface condition appearing in a waveform of the detection signal, and a first data communication unit configured to transmit the road surface data. The vehicle body side system includes a second data communication unit configured to receive the road surface data transmitted from the first data communication unit, and a road surface determination unit configured to determine a road surface condition of a traveling road surface of the vehicle based on the road surface data.

DETAILED DESCRIPTION OF THE EMBODIMENT

Figure 1:
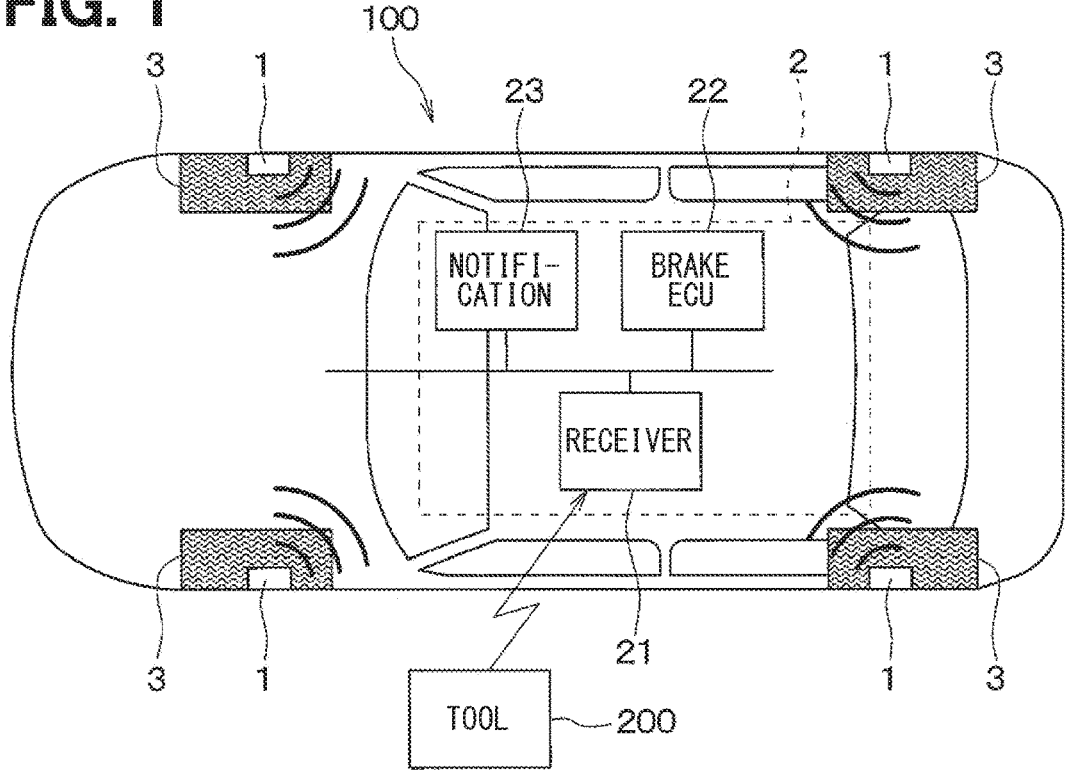
FIG. 1 is a schematic view showing a block configuration of a tire system including a road surface condition determination device according to a first embodiment in a state where the tire system is mounted in a vehicle.

Embodiments of the present disclosure will be described below with reference to the accompanying drawings. In each embodiment described below, same or equivalent parts are designated with the same reference numerals.

First Embodiment

A tire system 100 having a road surface condition determination function according to the present embodiment will be described with reference to FIG. 1 to FIG. 7. The tire system 100 according to the present embodiment is configured to determine a road surface condition during traveling based on a vibration applied to a ground contact surface of a tire provided in each of road wheels of a vehicle, and also perform warning of danger of the vehicle, vehicle movement control and the like based on the determined road surface condition.

Figure 2:
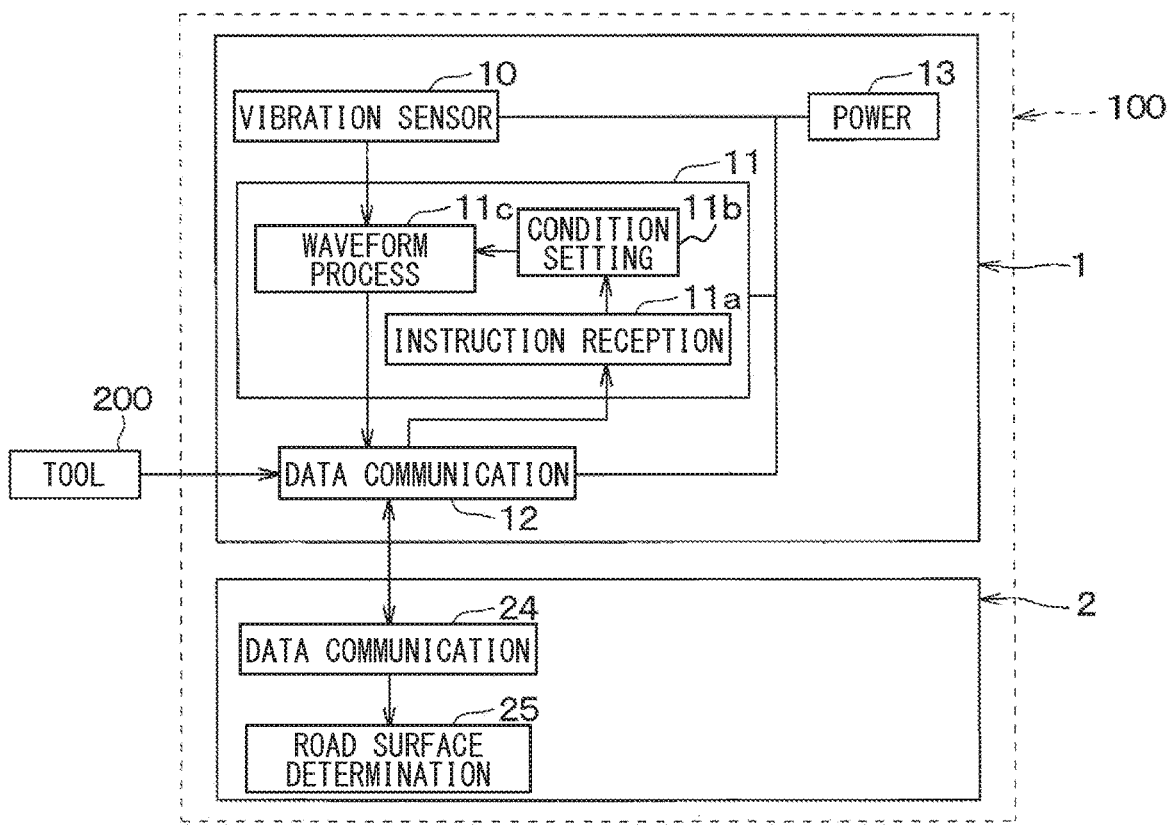
FIG. 2 is a block diagram showing respective details of tire side devices and a vehicle body side system of the road surface condition determination device.

As shown in FIG. 1 and FIG. 2, the tire system 100 is configured to have a plurality of tire side devices 1 provided on a plurality of road wheels, respectively, and a vehicle body side system 2, which includes various parts provided on a vehicle body. The vehicle body side system 2 includes a receiver 21, an electronic control unit for brake control (hereinafter referred to as a brake ECU) 22, a notification device 23 and the like. A part of the tire system 100, which performs a road surface condition determination operates as a road surface condition determination device. In the present embodiment, the tire side device 1 and the receiver 21 of the vehicle body side system 2 operate as the road surface condition determination device.

The tire system 100 according to the present embodiment is configured to transmit data (hereinafter, referred to as road surface data) corresponding to the road surface condition of a road, on which the tire 3 rotates, from the tire side device 1, and receive the road surface data by the receiver 21 thereby to determine the road surface condition. In addition, the tire system 100 is configured to transmit the determination result of the road surface condition determined by the receiver 21 to the notification device 23 and cause the notification device 23 to notify the determination result of the road surface condition. It is thus made possible to notify a driver of the road surface condition, for example, that the road surface is dry, wet or frozen. It is also made possible to warn the driver if the road surface is slippery. In addition, the tire system 100 is configured to perform vehicle motion control for avoiding danger by transmitting the road surface condition to the brake ECU 22 and the like that perform vehicle motion control. For example, when the road surface is frozen, the braking force generated with respect to the brake operation amount is weakened as compared with the case of a dry road, so that the vehicle motion control corresponding to a low road surface friction coefficient μ is performed. Specifically, the tire side device 1 and the vehicle body side system 2 are configured as follows.

Figure 3:
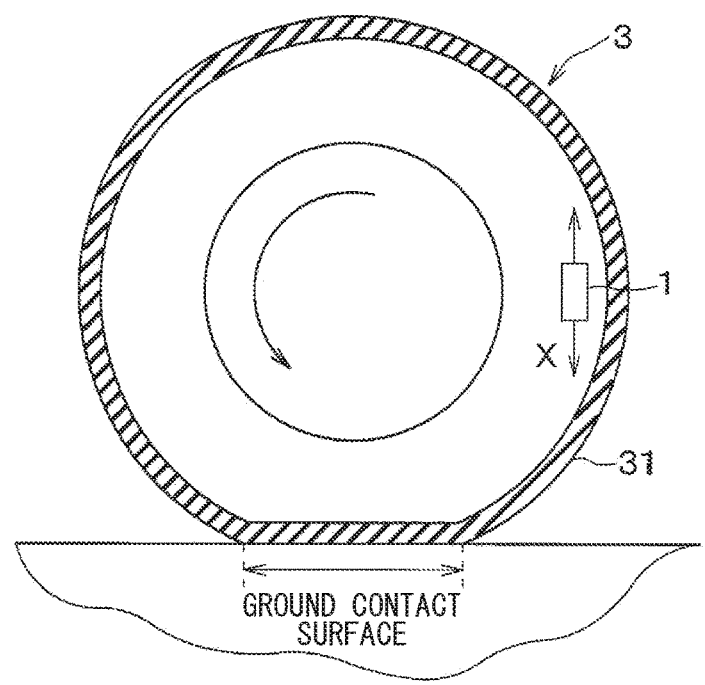
FIG. 3 is a schematic view showing in cross section a tire to which the tire side device is attached.

As shown in detail in FIG. 2, the tire side device 1 is configured to include a vibration sensor unit 10, a control unit 11, a data communication unit 12 and a power supply unit 13. As shown in FIG. 3, the tire side device 1 is provided on a back surface side, that is, radially inner side, of a tread 31 of each tire 3.

The vibration sensor unit 10 is configured as a vibration detection unit for detecting a vibration applied to the tire. For example, the vibration sensor unit 10 is configured by an acceleration sensor. In case that the vibration sensor unit 10 is the acceleration sensor, the vibration sensor unit 10 outputs a detection signal of acceleration as a detection signal, which corresponds to the vibration in a direction tangential to a circular trajectory drawn up by the tire side device 1 at the time of rotation of the tire 3, that is, a tire tangential direction indicated by an arrow X in FIG. 3. More specifically, the vibration sensor unit 10 generates as the detection signal an output voltage, which is positive in one direction and negative in the opposite direction, between two directions indicated with the arrow X. For example, the vibration sensor unit 10 performs acceleration detection at a predetermined sampling cycle set at a cycle shorter than a period of one rotation of the tire 3, and outputs a detection result as the detection signal. Although the detection signal of the vibration sensor unit 10 may be represented as an output voltage or an output current, the detection signal is exemplified to be an output voltage in the present embodiment as an example.

The control unit 11 is configured by a microcomputer having a CPU, a ROM, a RAM, an I/O, etc., to perform signal processing of the detection signal according to a program stored in the ROM or the like, and produce road surface data representing a road surface condition appearing in the detection signal. The control unit 11 is configured to include an instruction reception unit 11a, a condition setting unit 11b, and a waveform processing unit 11c as functional units that perform these processing.

When the instruction reception unit 11a receives an instruction signal transmitted from a tool 200 outside the vehicle, which will be described later, through the data communication unit 12, the instruction reception unit 11a plays a role of transmitting data included in the instruction signal to the condition setting unit 11b. Specifically, the instruction signal includes data indicating a sensing condition for each road wheel, and the instruction reception unit 11a is configured to transmit the data indicating the sensing condition included in the instruction signal to the condition setting unit 11b. The details of the sensing condition will be described later.

The condition setting unit 11b is configured to set the sensing condition of the detection signal of the vibration sensor unit 10 by the waveform processing unit 11c based on the data of the sensing condition included in the instruction signal transmitted from the instruction reception unit 11a.

Each tire side device 1 is assigned unique identification information (hereinafter, referred to as ID information) which is different from device to device. The instruction signal includes ID information in addition to the data indicating the sensing condition. Each tire side device 1 determines whether it is an instruction signal for itself based on the ID information attached to the instruction signal. For this reason, the instruction reception unit 11a is configured to transmit, at the time of receiving the instruction signal assigned with its own ID information, a signal indicating a content to the condition setting unit 11b.

The waveform processing unit 11c is configured to use the detection signal output from the vibration sensor unit 10 as the detection signal representing vibration data in the tire tangential direction, and performs waveform processing of the vibration waveform indicated by the detection signal to generate road surface data for a road surface condition determination. The sensing by the waveform processing unit 11c is performed according to the sensing condition set by the condition setting unit 11b. In case of the present embodiment, the waveform processing unit 11a is configured to process the detection signal of the acceleration of the tire 3 (hereinafter referred to as tire G) to extract a characteristic value of the tire G, and outputs data including the characteristic value as the road surface data. Further, the waveform processing unit 11c is configured to transmit the road surface data to the data communication unit 12, when the waveform processing unit 11c generates the road surface data, Details of the characteristic value will be described later.

Further, the waveform processing unit 11c is configured to control data transmission from the data communication unit 12 and transmit the road surface data to the data communication unit 12 at a timing at which data transmission is desired. Thus, the waveform processing unit 11 performs data communication with the data communication unit 12. For example, the waveform processing unit 11c extracts the characteristic value of the tire G each time the tire 3 makes one rotation, and transmits the road surface data to the data communication unit 12 once or a plurality of times each time the tire 3 makes one rotation or a plurality of rotations. For example, the waveform processing unit 11c transmits to the data communication unit 12 the road surface data including the characteristic value of the tire G extracted based on a predetermined sensing condition during one rotation of the tire 3 when transmitting the road surface data to the data communication unit 12.

The data communication unit 12 is a part of a data transmission unit. For example, when the road surface data is transmitted from the waveform processing unit 11, the data communication unit 12 transmits the road surface data at that timing. The timing of data transmission from the data communication unit 12 is controlled by the waveform processing unit 11. Each time the road surface data is transmitted from the waveform processing unit 11c every time the tire 3 makes one or more rotations, the data communication unit 12 performs the data transmission.

Further, the data communication unit 12 is configured to perform bidirectional communication and also operate to receive data sent from the vehicle body side system 2.

Further, the data communication unit 12 is also configured to receive data from devices other than the tire side device 1, such as the tool 200, by using its signal receiving function. In case of the present embodiment, the data communication unit 12 receives the instruction signal indicating the sensing condition transmitted from the tool 200 and transmits it to the instruction reception unit 11a.

The data communication unit 12 is exemplified as a single unit, but may be configured separately as a transmission unit and a reception unit. Various forms of bidirectional communication may be applied, such as Bluetooth communication including BLE (Bluetooth Low Energy) communication, wireless LAN (Local Area Network) such as wifi, Sub-GHz communication, ultra wideband communication, ZigBee, etc. can be applied. Bluetooth is a registered trademark.

The power supply unit 13 is provided as a power supply for the tire side device 1, and supplies electric power to each unit included in the tire side device 1 so that each unit can be operated. The power supply unit 13 is configured by a battery such as a button battery, for example. Since the tire side device 1 is provided within the tire 3, the battery cannot be easily replaced. It is therefore necessary to reduce power consumption. In place of the battery, the power supply unit 15 may be configured by a power generator, a storage battery, and the like. In case the power supply unit 15 has a configuration including the power generator, the problem of battery life is reduced as compared with the case where the power supply unit 13 is the battery. It is however difficult to generate a large power. Therefore it is necessary to reduce power consumption.

On the other hand, the receiver 21, the brake ECU 22 and the notification device 23 forming the vehicle body side system 2 are configured to become operable when a start switch such as an ignition switch (not shown) is turned on.

The receiver 21 is configured to include a data communication unit 24 and a road surface determination unit 25, as shown in FIG. 2.

The data communication unit 24 is a part of data reception unit, and provided to receive the road surface data including a characteristic value and transmitted from the data communication unit 12 of the tire side device 1 and transmit the road surface data to the road surface determination unit 25.

The road surface determination unit 25 is also configured by a well-known microcomputer including a CPU, a ROM, a RAM, an I/O, and performs various processing according to a program stored in the ROM or the like to determine a road surface condition. Specifically, the road surface determination unit 25 stores a support vector, and determines the road surface condition by comparing the road surface data transmitted from the waveform processing unit 11c with the stored support vector.

The support vector is set and stored for each type of road surface. The support vector is a characteristic value serving as a model, and is acquired, for example, by learning using a support vector machine. The support vector is acquired by experimentally driving a vehicle equipped with the tire side device 1 on each type of road surface. During the experimental driving, the characteristic value extracted by the waveform processing unit 11c is learned for a predetermined number of tire rotations, and a predetermined number of typical characteristic values are extracted from the learned data. For example, the characteristic values are learned for one million rotations for each type of road surface, and a typical characteristic value for 100 rotations is extracted from the learned values as the support vector.

Then, the road surface determination unit 25 determines the road surface condition by comparing the characteristic value transmitted from the tire side device 1 and received by the data communication unit 24 with the stored support vector for each type of road surface. For example, the road surface determination unit 25 compares the characteristic value included in the road surface data received at present time with the support vectors stored for each type of the road surface, and determines the road surface condition corresponding to the support vector which is closest to the present characteristic value to be a presently traveling road surface.

After determining the road surface condition, the road surface determination unit 25 transmits the road surface condition to the notification device 23, which notifies a driver of the road surface condition if necessary. Thus, the driver is enabled to try to drive the vehicle in a manner matching the road surface condition and avoiding danger to the vehicle. For example, the determined road surface condition may be displayed always by the notification device 23 or the road surface condition may be displayed to warn the driver only when the vehicle need be driven more carefully than usual, for example, when the determined road surface condition corresponds to a wet road or a frozen road. The road surface condition is transmitted from the receiver 21 to an ECU such as the brake ECU 22, which performs vehicle motion control, so that the vehicle motion control is performed based on the transmitted road surface condition.

The brake ECU 23 is configured as a brake control device that performs various brake controls. Specifically, the brake ECU 22 controls a braking force by increasing or decreasing a wheel cylinder pressure by driving an actuator, which controls a brake fluid pressure. In addition, the brake ECU 23 independently controls the braking force of each road wheel. When the road surface condition is transmitted from the receiver 21, the brake ECU 22 controls the braking force as the vehicle motion control based on the transmitted road surface condition. For example, when the transmitted road surface condition indicates a frozen road, the brake ECU 22 reduces the braking force generated in response to the amount of brake operation by the driver, as compared with a dry road surface. Thereby, wheel slip can be suppressed, and danger of the vehicle can be avoided.

The notification device 23 is configured with a meter display device, for example, and used to notify the driver of the road surface condition. In case that the notification device 23 is configured with the meter display device, it is located at a position which the driver is capable of easy recognition during driving of the vehicle, for example, within an instrument panel in the vehicle. When the road surface condition is transmitted from the receiver 21, the meter display device visually notifies the driver of the road surface condition by performing display in such a manner that the condition of the road surface can be recognized.

The notification device 23 may alternatively be configured as a buzzer or a voice guidance device. In such a case, the notification device 23 notifies the driver of the road surface condition audibly by buzzer sound or voice guidance. Although the meter display device is exemplified as the notification device 23 providing visual notification, the notification device 23 may be configured as a display device that displays information such as a head-up display.

The tire system 100 is configured as described above in the present embodiment. Each unit forming the vehicle body side system 2 is connected through an in-vehicle LAN (Local Area Network) like CAN (Controller Area Network) communication. Thus each unit is capable of communicating information mutually through the in-vehicle LAN.

Furthermore, in case of the present embodiment, in addition to the tire system 100, the tool 200 is provided outside the vehicle. The tool 200 is an external device used in an automobile maintenance and repair shop such as a dealer. This tool 200 transmits an instruction signal including the sensing condition to each tire side device 1, and sets the sensing condition to be followed and performed in generating the road surface data from the detection signal of the vibration sensor unit 10 in each tire side device 1.

The tire system 100 and the tool 200 are configured as described above in the present embodiment.

Next, operations of the tire system 100 and the tool 200 according to the present embodiment will be described.

In the tire system 100, the waveform processing unit 11c extracts the characteristic value of the tire vibration from the detection signal of the vibration sensor unit 10, and then determines the road surface condition based on the extracted characteristic value and the support vector stored in the road surface determination unit 25. When the road surface condition is determined, the sensing condition of the detection signal of the vibration sensor unit 10 by the waveform processing unit 11c is set based on the instruction signal from the tool 200.

Here, a method of determining the road surface condition by the tire system 100 and the sensing condition of the detection signal of the vibration sensor unit 10 will be described.

First, the method of determining the road surface condition will be described together with the details of the characteristic value extracted by the waveform processing unit 11c. The method of extraction of the characteristic value and determination of the road surface condition do not take the sensing condition into consideration.

First, details of the characteristic value extracted by the waveform processing unit 11c will be described.

The characteristic value is a value which represents a feature of the vibration applied to the tire 3 as acquired by the vibration sensor unit 10 and, for example, expressed by a characteristic vector.

Figure 4:
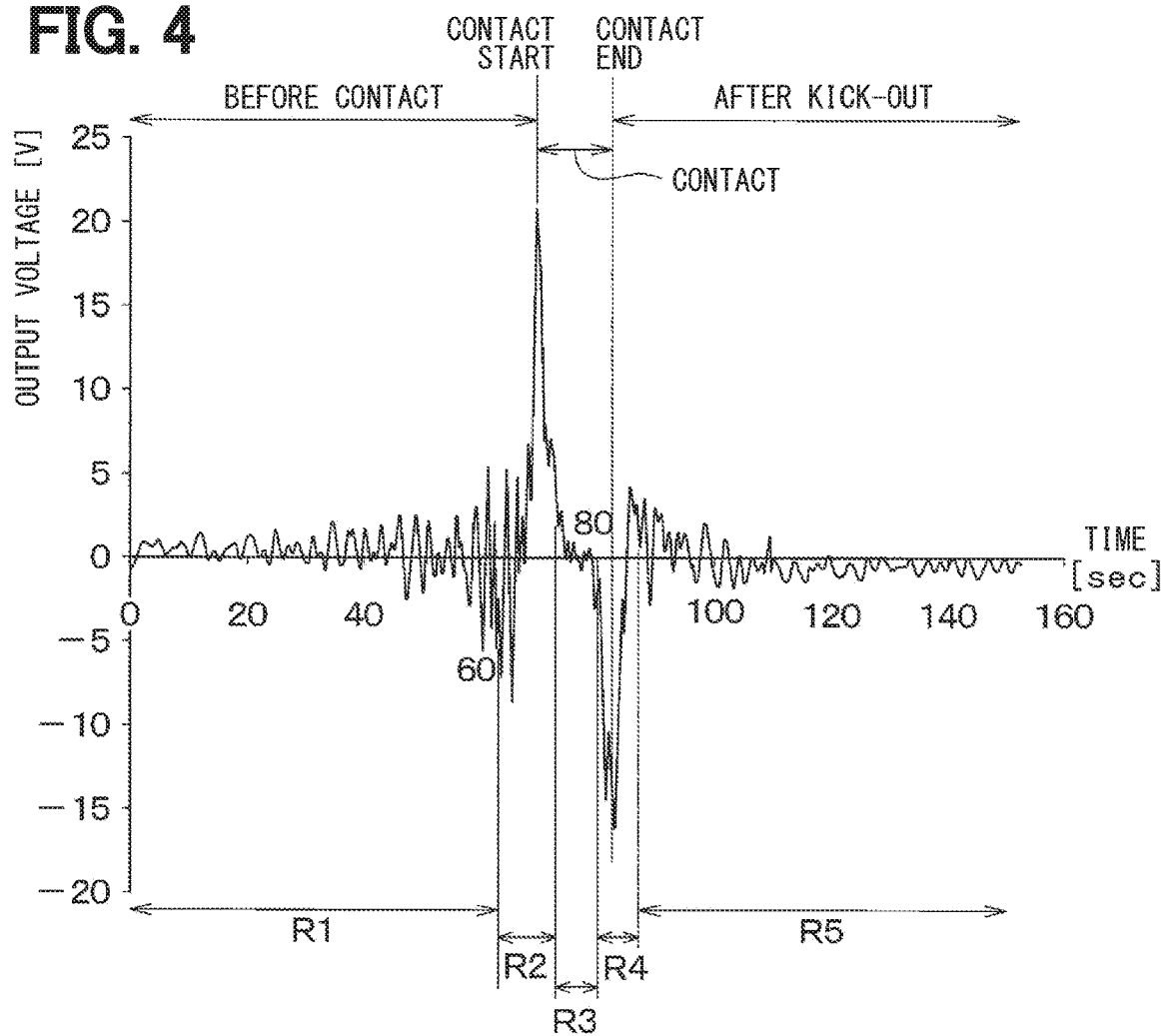
FIG. 4 is an output voltage waveform chart of a vibration sensor unit during rotation of the tire.

For example, the output voltage waveform of the detection signal of the vibration sensor unit 10 output at the time of tire rotation changes as shown in FIG. 4. As shown in this figure, the output voltage of the vibration sensor unit 10 has a local maximum value when a portion of the tread 31 corresponding to the location of the vibration sensor unit 10 (hereinafter, referred to as a device mounting position) starts to contact the ground during rotation of the tire 3. Hereinafter, a peak value at the start time of contacting the ground where the output voltage of the vibration sensor unit 10 has the local maximum value is referred to as a first peak value. Further, as shown in FIG. 4, the output voltage of the vibration sensor unit 10 takes a local minimum value at a ground contact end time when the portion of the tire corresponding to the device mounting position is separated from the ground. Hereinafter, a peak value at the end time of contacting the ground where the output voltage of the vibration sensor unit 10 has the local minimum value is referred to as a second peak value.

The output voltage of the vibration sensor unit 10 takes the peak values at the above-described timings for the following reasons. When the device mounting position comes to contact the ground during rotation of the tire 3, the portion of the tire 3 having been in generally cylindrical shape is pressed and deformed in a planar shape near the vibration sensor unit 10. In response to an impact at this time, the output voltage of the vibration sensor unit 10 takes the first peak value. When the portion of the tire 3 corresponding to the device mounting location leaves the ground surface during rotation of the tire 3, the portion of the tire 3 corresponding to the vibration sensor unit 10 is released from pressurization and restores the generally cylindrical shape from the planar shape. With reception of an impact at the time of restoring the original shape of the tire 3, the output voltage of the vibration sensor unit 10 takes the second peak value. As described above, the output voltage of the vibration sensor unit 10 takes the first peak value and the second peak value at the ground contact start time and the ground contact end time, respectively. Since a direction of the impact at the time when the tire 3 is pressed and a direction of the impact at the time when the tire 3 is released from pressurization are opposite, polarities of the output voltage are also opposite.

Here, the moment when the device mounting position touches the road surface is referred to as a step-in region, and the moment when the device mounting position is separated from the road surface is referred to as a kick-out region. The step-in region includes the timing of the first peak value, and the kick-out region includes the timing of the second peak value. Further, a region before the step-in region is referred to as a pre-contact region, a region from the step-in region to the kick-out region, that is, a region in which the device mounting position is in contact with the ground is referred to as a contact region, and a region after the kick-out region is referred to as a post-contact region. In this way, the period in which the device mounting position is grounded and before and after the period can be divided into five time zones. In FIG. 4, the pre-contact region, the step-in region, the pre-kick-out region, the kick-out region and the post-contact region of the detection signal are indicated as five zones R1 to R5 in sequence, respectively.

The vibration generated in the tire 3 varies in each of the divided regions according to the road surface condition, and the detection signal of the vibration sensor unit 10 changes correspondingly. Therefore, by analyzing the frequency of the detection signal of the vibration sensor unit 10 in each region, the road surface condition of the vehicle on the road surface is detected. For example, in a slippery road surface such as a snow-covered road, the shearing force at the time of kicking out decreases, so that a frequency band value selected from 1 kHz to 4 kHz band in the kick-out region R4 and the post-contact region R5 decreases. Since each frequency component of the detection signal of the vibration sensor unit 10 changes according to the road surface condition, it is possible to determine the road surface condition based on the frequency analysis of the detection signal.

Figure 5:
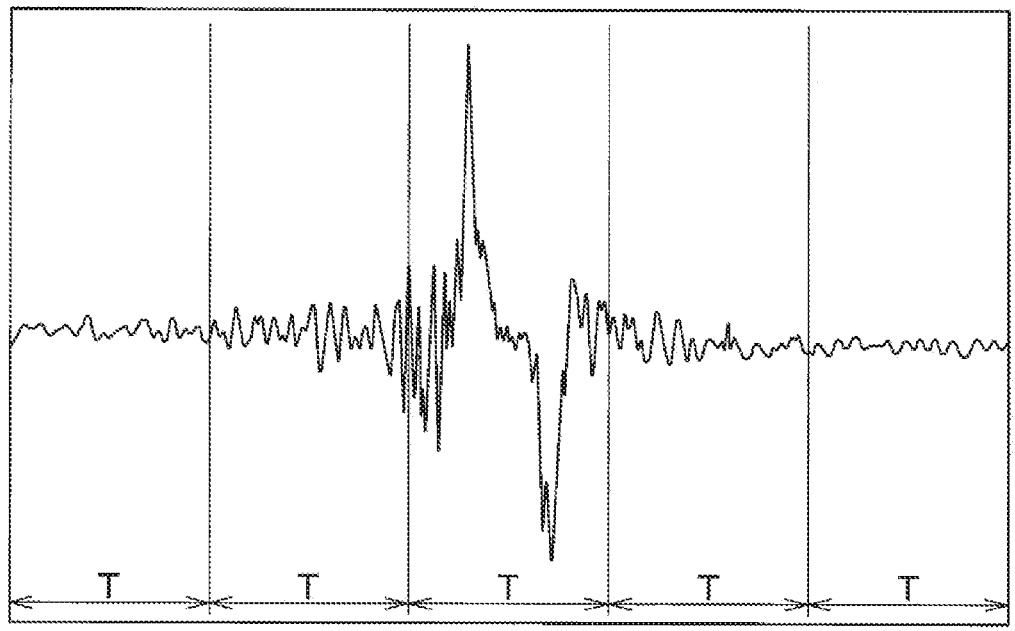
FIG. 5 is a chart which shows a detection signal of the vibration sensor section in a manner divided into plural zones each of which is a time window of a predetermined time width T.

The waveform processing unit 11a divides the detection signal of the vibration sensor unit 10 for one rotation of the tire 3 having a continuous time-axis waveform into a plurality of sections each having a predetermined time width T as shown in FIG. 5, performs the frequency analysis in each section, and extracts the characteristic value. Specifically, by performing the frequency analysis in each section, the waveform processing unit 11c calculates a power spectrum value in each frequency band, that is, a vibration level in a specific frequency band, as the characteristic value.

The number of sections divided by the time window of the time width T is a value that varies with the vehicle speed, more specifically, with the rotation speed of the tire 3. In the following description, the number of sections for one rotation of the tire 3 is assumed to be "n" (where "n" is a natural number).

For example, the characteristic value is calculated as the power spectrum value, which is acquired by passing the detection signal of each section through a plurality of filters of a specific frequency band, for example, five band-pass filters of 0 to 1 kHz, 1 to 2 kHz, 2 to 3 kHz, 3 to 4 kHz, and 4 to 5 kHz. This characteristic value is a characteristic vector Xi of a section "i" (natural number 1≤i≤n), which is expressed as a matrix of elements defined by the following equation. In this matrix, each element is represented as the power spectrum value aik in each specified frequency band. This characteristic value is a characteristic vector Xi of a section "i" (natural number 1≤i≤n), which is expressed as a matrix of elements defined by the following equation 1.

$$X_i = \begin{bmatrix} a_{i1} \\ a_{i2} \\ a_{i3} \\ a_{i4} \\ a_{i5} \end{bmatrix} \quad \text{[Equation 1]}$$

"K" of the power spectrum value aik is the number of the specific frequency bands, that is, the number of the band-pass filters. In case that the frequency band of 0 to 5 kHz is divided into five sections as exemplified above, "k" is 1 to 5 (k=1 to 5). The determinant X that comprehensively represents the characteristic vectors X1 to Xn of all the sections 1 to n is as follows.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Equation 2]}$$

This determinant X is an equation representing the characteristic value of one rotation of the tire. The control unit 11 extracts the characteristic value represented by the above determinant X by frequency-analyzing the detection signal of the vibration sensor unit 10.

The method of determining the road surface condition based on the support vector will be described next.

As described above, the road surface condition can be determined by comparing the characteristic value included in the road surface data transmitted from the tire side device 1 with the support vector for each road surface type stored in the support vector storage unit. For example, by calculating the degree of similarity of the characteristic value relative to all of the support vectors of different road surface types, the road surface which has the highest similarity may be determined to be the presently traveling road.

For example, the calculation of a degree of similarity of the characteristic value to all the support vectors stored for each type of the road surfaces can be performed by a method as described below.

As described above, for the determinant X representing the characteristic value, the determinant of the characteristic value is expressed as X(r), the determinant of the support vector is expressed as X(s), and the power spectrum value aik as each element of the determinants is expressed by a(r)ik and a(s)ik. In this case, the determinant X(r) of the characteristic value and the determinant X(s) of the support vector are respectively expressed as follows.

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Equation 3]}$$

$$X(s) = \begin{pmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{[Equation 4]}$$

The similarity indicates the degree of similarity between the characteristic values indicated by the two determinants and the support vector, and means that the higher the degree of similarity, the more similar. In case of the present embodiment, the road surface determination unit 25 calculates the similarity using the kernel method, and determines the road surface condition based on the similarity. In case of the present embodiment, the road surface determination unit 25 calculates the similarity using the kernel method, and determines the road surface condition based on the similarity. Here, the inner product of the determinant X(r) of the characteristic value and the determinant X(s) of the support vector, that is, a distance between coordinates indicated by the characteristic vectors Xi of the sections divided for each time window of the predetermined time width T in a characteristic space, is calculated and used as the degree of similarity.

Figure 6:
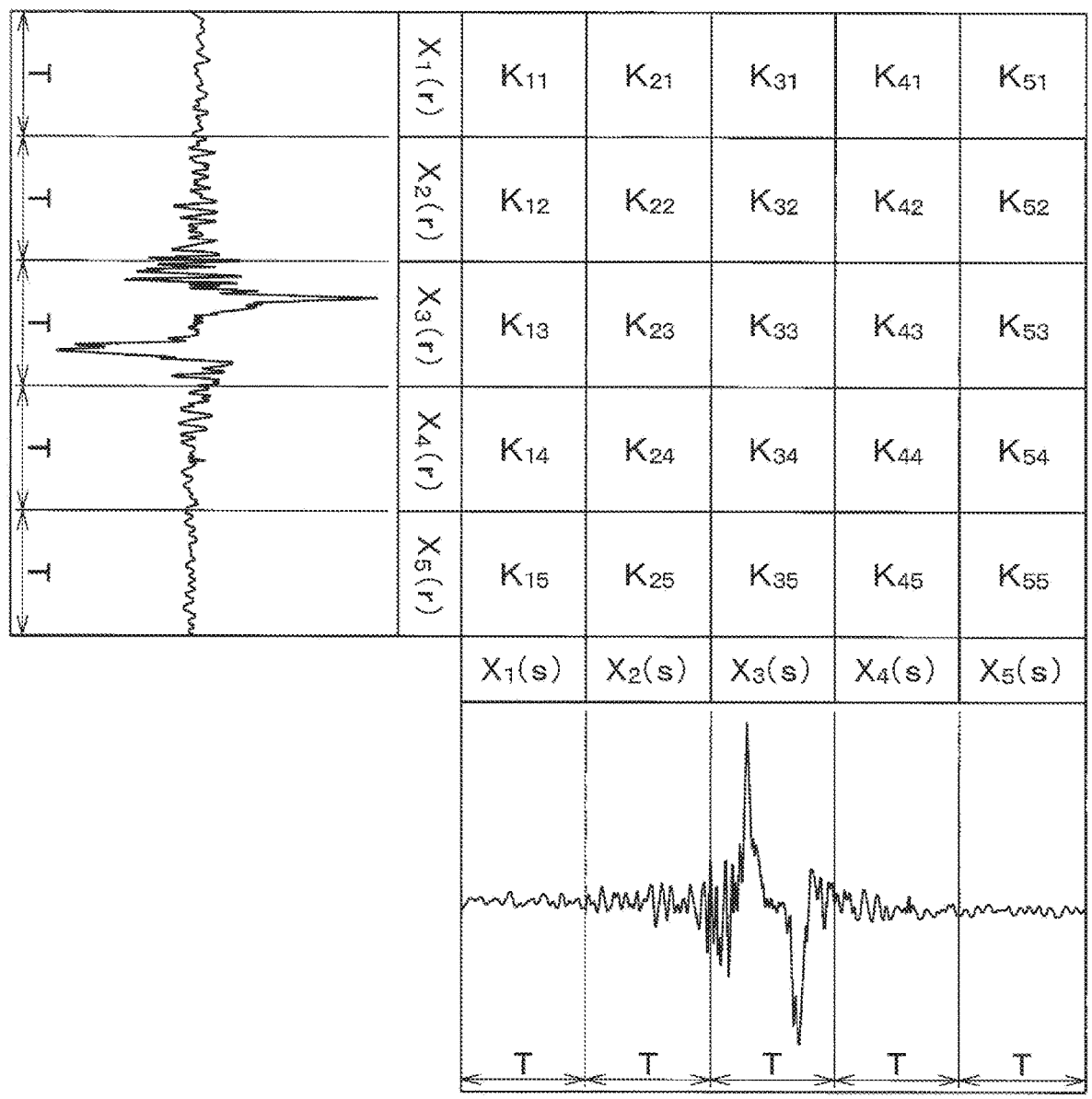
FIG. 6 is a chart illustrating respective relationships between determinants $Xi(r)$ and $Xi(s)$ and a distance $Kyz$ in each segment determined by dividing, by each of the time windows having the predetermined time width T, a time axis waveform during a tire rotation of present time and a time axis waveform during a tire rotation of immediately preceding time.

For example, as shown in FIG. 6, regarding the time-axis waveform of the detection signal of the vibration sensor unit 10, each of the time-axis waveform at the time of present rotation of the tire 3 and the time-axis waveform of the support vector is divided into each section by the time window of the predetermined time width T. In the illustrated example, since each time-axis waveform is divided into five sections, "n" is 5, and "i" is represented by Here, as shown in the figure, the characteristic vector Xi of each section at the time of present rotation of the tire 3 is Xi(r), and the characteristic vector of each section of the support vector is Xi(s). In this case, regarding the distance Kyz between the coordinates indicated by the characteristic vector Xi of each section, it is shown like a cell where a horizontal cell including the characteristic vector Xi(r) of each section at the time of present rotation of the tire 3 and a vertical cell containing the characteristic vector Xi(s) of the support vector intersect. As for the distance Kyz, "y" is determined by rewriting "i" in Xi (s), and "z" is determined by rewriting "i" in Xi(r). It should be noted that the numbers of sections between the support vector and the present rotation of the tire 3 may become different depending on the vehicle speed. It is however assumed here that the numbers of sections are equal.

In case of the present embodiment, the characteristic vectors are acquired by dividing into five specific frequency bands. Therefore, the characteristic vector Xi of each section is represented in the six-dimensional space combined with the time-axis, and the distance between the coordinates indicated by the characteristic vectors Xi of the sections is the distance between the coordinates in the six-dimensional space. However, the distance between the coordinates indicated by the characteristic vector of each section is smaller and larger as the characteristic value and the support vector are more similar and less similar, respectively. Therefore, the similarity becomes higher as the distance becomes smaller, and the similarity becomes lower as the distance becomes larger.

For example, in case the segments 1 to n are provided by time division, each of the distances Kyz between the coordinates represented by the characteristic vectors of the individual segments 1 is expressed by the following equation.

$$Kyz = \sqrt{\{a(r)_{11} - a(s)_{11}\}^2 + \{a(r)_{12} - a(s)_{12}\}^2 + \ldots \{a(r)_{15} - a(s)_{15}\}^2} \quad \text{[Equation 5]}$$

In this way, the distance Kyz between the coordinates indicated by the characteristic vectors of the sections by time division is acquired for all the sections, a total sum Ktotal of the distances Kyz of all sections is calculated, and this total Ktotal is used as a value corresponding to the similarity. Then, the total Ktotal is compared with a predetermined threshold value Th. If the total Ktotal is larger than the threshold value Th, the similarity is determined to be low. If the total Ktotal is smaller than the threshold value Th, the similarity is determined to be high. Then, the similarity is calculated for all the support vectors, and it is determined that the type of the road surface corresponding to the support vector having the highest similarity is determined to be the road surface condition of the presently traveling road. Thus, the road surface condition can be determined.

Here, the total sum Ktotal of the distances Kyz between the two coordinates indicated by the characteristic vectors of the respective sections is used as the value corresponding to the degree of similarity. However, another parameter indicating the degree of similarity may be used. For example, as a parameter indicating the degree of similarity, an average distance Kave, which is an average value of distances Kyz calculated by dividing the total sum Ktotal by the number of sections, may be used, or the degree of similarity may be determined by using various kernel functions as proposed conventionally. Instead of using all of the characteristic vectors, the degree of similarity may be calculated by excluding a path having a low similarity from the characteristic vectors.

The operation of the tool 200 will be described next together with the sensing condition of the detection signal, which the instruction signal of the tool 200 indicates.

The tool 200 is used when setting the sensing condition of the tire side device 1 of each road wheel in a vehicle maintenance shop or the like, and transmits an instruction signal for setting the sensing condition for each tire side device 1. This instruction signal is transmitted to the condition setting unit 11b through the instruction reception unit 11a of each tire side device 1, so that sensing condition of each tire side device 1 is set.

The sensing condition means various conditions such as an acquisition condition of acquiring the detection signal performed when the road surface data is generated from the detection signal of the vibration sensor unit 10, the calculation condition of the characteristic value, the data amount included in the road surface data, and the like.

The above description indicates a case where the detection signal of the vibration sensor unit 10 for one rotation of the tire 3 is used to perform the characteristic value extraction and the road surface condition determination based on the support vector. However, in the present embodiment, as described above, the sensing condition of the detection signal of the vibration sensor unit 10 is set based on the sensing condition indicated by the instruction signal of the tool 200. Therefore, the extraction of the characteristic value and the determination of the road surface condition based on the support vector are methods according to the sensing condition.

Specifically, the sensing condition is not set to be the same for all four wheels, but is set individually to include different conditions. Generally, the road surface condition of the road on which the vehicle travels is uniform, and the same road surface condition is determined by the tire side devices 1 of four road wheels. However, it is not necessary to determine the same road surface condition based on all tire side devices 1 of four wheels under the same sensing condition. That is, it suffices that the road surface condition is determined based on at least one tire side device 1 of the four tire side devices 1, and the sensing conditions may be made different when the same road surface condition is detected. Therefore, in the present embodiment, in consideration of the reduction of power consumption in the power supply unit 13, as the sensing condition, a condition in which the tire side device 1 of each of the four wheels has different roles. Specifically, two or more different conditions are set. For example, different roles may be assigned to two tire side devices 1 of four wheels and the remaining two tire side devices 1 of four wheels, or different roles may be assigned to all of the four wheels. Also, only one of the four tire side devices 1 of four wheels may be assigned a different role from the other three tire side devices 1.

Further, among a plurality of types of road surface conditions, it is particularly desirable to determine the road surface condition when the road surface condition is slippery, such as a wet road or a frozen road. For this reason, in the present embodiment, the sensing condition is set as different roles such that the wet road is more easily determined in the tire side device 1 of at least one wheel and the frozen road is further determined easily in the tire side device 1 of at least one different wheel. Here, the sensing condition is set so that the tire side devices 1 for two front wheels can more easily determine the wet road and the tire side devices 1 for two rear wheels can more easily determine the frozen road.

For example, from the detection signal of the vibration sensor unit 10 for one rotation of the tire, the characteristic value is extracted by using a portion having a high characteristic level, which particularly represents the road surface condition. In the present embodiment, the characteristic value is extracted using the portion having the highest characteristic level among the extracted high characteristic values.

The characteristic level is a rate at which the difference between the characteristic values increases depending on the type of road surface condition. The difference of the characteristic values corresponding to the types of the road surface condition becomes remarkable as the characteristic level is higher. For this reason, by determining the road surface condition using the characteristic value of high characteristic level, it is possible to determine the road surface condition with less number of road surface data.

For example, in a specific road surface condition, the characteristic level becomes higher in a specific area during one rotation of the tire. As described above, the output voltage waveform of the detection signal of the vibration sensor unit 10 changes in one rotation of the tire as shown in FIG. 4. For example, on a wet road, a large difference appears in the region R2 in the characteristic values with respect to other types of road surfaces such as a dry road and a frozen road. This is because the amount of slip that occurs immediately before the device mounting position comes into contact the road surface on the wet road is larger than on other road surfaces. Further, on a frozen road, a large difference appears in the region R3 in the characteristic value with respect to other types of road surfaces such as a dry road and a wet road. This is because, on the frozen road, the device mounting position is most affected by the vibration caused by the slip of the road surface during the ground contact. Furthermore, as described above, on a slippery road surface such as a snow-covered road, a large difference in the characteristic values appears in the region R4 with respect to other types of road surfaces such as a dry road and a wet road. In this way, the characteristic level becomes high in a specific region during one rotation of the tire depending on the type of road surface.

It is noted that the specific region here typically corresponds to the regions R1 to R5, but may be a part of the regions R1 to R5, such as a portion of the region R1 closer to the region R2, or may cover several regions including the regions R2 and R3. Further, since the specific region can be grasped as one or a plurality of sections obtained by dividing the detection signal by the time width T, it also means a portion of the detection signal generated at the predetermined timing or during the predetermined period in one rotation of the tire.

In this way, for example, the characteristic value of the specific region can be extracted from the detection signal for one rotation of the tire in the vibration sensor unit 10. In case of the present embodiment, the tire side device 1 for each front wheel extracts the characteristic value of the region R2 so that the wet road can be more easily determined, and the tire side device 1 for each rear wheel extracts the characteristic value of the region R3 so that the frozen road can be more easily determined. For example, when the characteristic value of the region R2 is extracted, the characteristic value in a frame C1 surrounded by the alternate long and short dash line in equation 6. The same applies to the case of extracting the characteristic value of the region R3.

[Equation 6]
$$X(r) = \begin{pmatrix} a(r)_{11} & \boxed{a(r)_{21}} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix}$$

In this way, the tire side device 1 of each wheel is made to share the role. Each tire side device 1 senses different regions of the detection signal of the vibration sensor unit 10 for one rotation of the tire 3 to extract the characteristic value. Then, the characteristic values extracted by sensing different areas are transmitted as the road surface data from each tire side device 1 to the vehicle body side system 2.

Therefore, the tire side device 1 of each wheel does not need to perform sensing for extracting the characteristic value in the entire regions of the detection signal of the vibration sensor unit 10 for one rotation of the tire 3. For example, the characteristic value may be calculated only for the regions R2 and R3 that are predetermined regions in the detection signal of the vibration sensor unit 10.

Therefore, the calculation weight of the tire side device 1 of each wheel can be reduced, and power saving can be achieved. Further, in case the road surface data including the characteristic value of one rotation of the tire 3 is used, the data amount of the road surface data to be transmitted is large. In the present embodiment, the road surface data to be transmitted can be limited to the road surface data including only a part of the characteristic data of one rotation of the tire 3. Thus the amount of data to be transmitted is reduced. Therefore, it is possible to further reduce power consumption.

Further, when the road surface data is generated in this way, it is transmitted to the vehicle body side system 2, and the road surface condition determination is performed by the road surface determination unit 25. At this time, although the road surface data includes only a part of the characteristic value, the road surface condition determination is performed as follows.

Specifically, when the road surface condition determination unit 25 receives the road surface data including only a part of the characteristic value during one rotation of the tire, the road surface condition determination unit 25 calculates the degree of similarity by using the part of the characteristic value during one rotation of the tire included in the road surface data and the a part of the support vector corresponding to the received part of the characteristic value.

Figure 7:
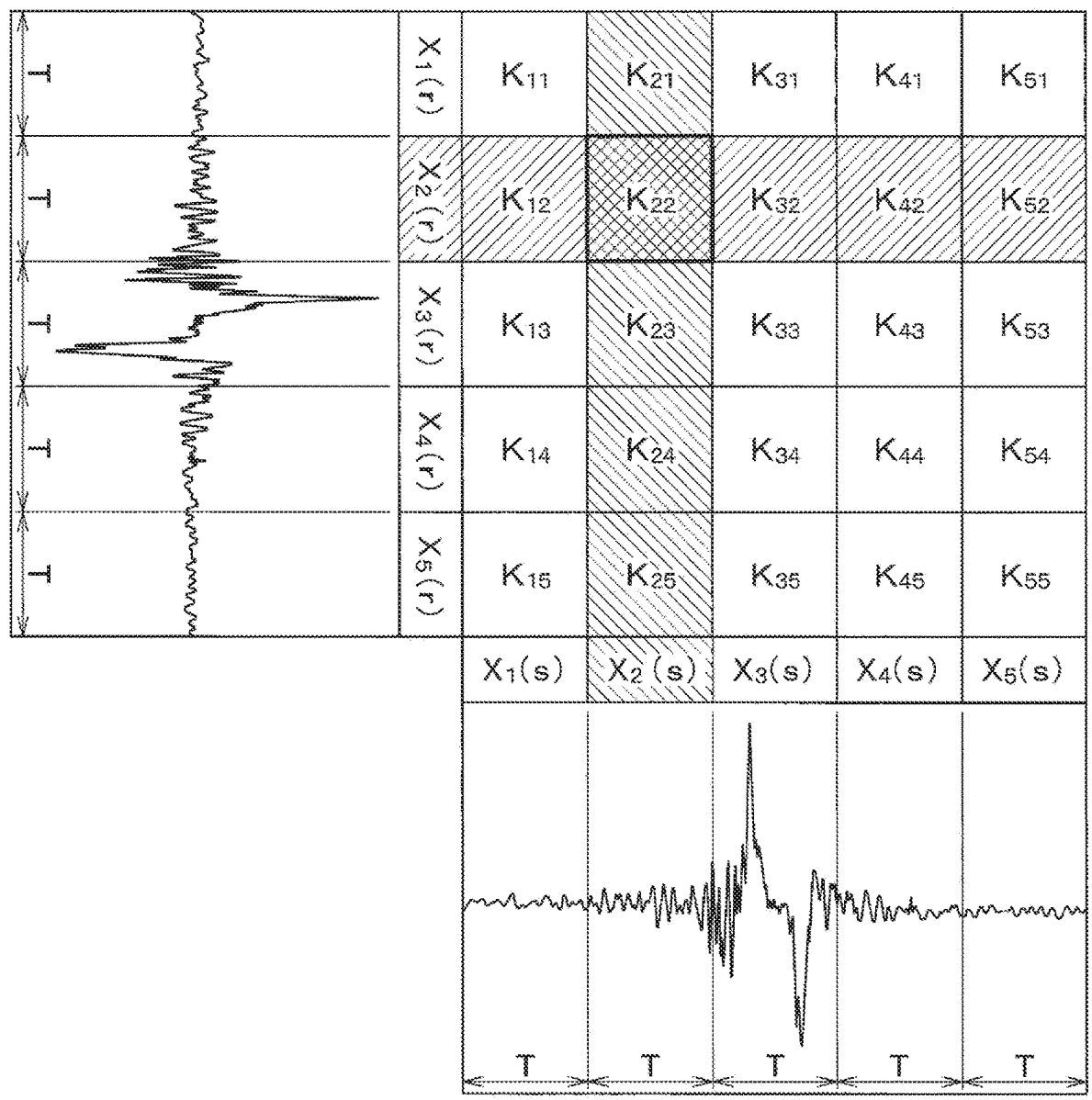
FIG. 7 is a chart showing relationships between the determinants $Xi(r)$ and $Xi(s)$ and the distance $Kyz$ and illustrating a method of calculating a degree of similarity when characteristic values in a region R2 are selected.

For example, as indicated by the equation 6, when the road surface data includes the characteristic value of the region R2, the portion corresponding to the region R2 is extracted from all the support vectors for each type of road surface. Then, the degree of similarity between the characteristic values of the region R2 and the portion corresponding to the region R2 extracted from all the support vectors for each type of road surface is calculated. In the example shown in FIG. 6, since the section 2 corresponds to the region R2, the degree of similarity between the characteristic vector $X2(r)$ of the section 2 determined by time division and the characteristic vector $X2(s)$ corresponding to the section 2 extracted from the support vector is calculated as shown in FIG. 7. In this case, the degree of similarity is calculated as a distance K22 between the coordinates indicated by the characteristic vectors of the same sections 2.

In this way, the similarity is calculated based on a part of the characteristic value in one rotation of the tire, and the road surface condition determination is performed based on the calculated degree of similarity. When the traveling road surface changes from a dry road to a wet road, for example, a road surface condition determination result indicating that the traveling road surface has changed to the wet road is issued quickly based on the road surface data from the tire side devices 1 for two front wheels. In this way, when the change to the wet road is confirmed, the determination result of the road surface condition change to the wet road is transmitted the brake ECU 22 and the notification device 23 even if the change to the wet road is not confirmed from the road surface data from the tire side devices 1 of two rear wheels. Similarly, when the traveling road surface changes from the dry road to the frozen road, for example, a road surface condition determination result that the road surface has changed to the frozen road is quickly issued based on the road surface data from the tire side devices 1 for two rear wheels. In this way, when the change to the frozen road is confirmed, the brake ECU 22 and the notification device 23 are notified of the result of the determination that the road surface determination has changed to the frozen road even if the change to the frozen road is not confirmed in the road surface data from the tire side devices 1 of two front wheels. As a result, the vehicle motion control can be promptly performed when the road surface condition determination result has changed to the wet road or the frozen road, and the driver can be notified of the road surface condition change.

As described above, the tire system 100 according to the present embodiment can determine the road surface condition of the traveling road surface of the vehicle. The sensing conditions are set so that the tire side devices 1 of the respective wheels do not all play the same role but have different roles. Therefore, compared with the case where all the tire side devices 1 of the respective wheels performs the same functions, the calculation weight in each tire side device 1 can be reduced and the data amount of the road surface data can be reduced. Even if the functions are different, the road surface condition can be accurately determined based on the road surface data from any of the tire side devices 1. Therefore, it is possible to accurately determine the road surface condition while reducing the power consumption.

Modification of First Embodiment

In the first embodiment, as the sensing condition, the characteristic value of the region R2 is extracted in relation to two front wheels, and the characteristic value of the region R3 is extracted in relation to two rear wheels. This is an example of the sensing condition.

For example, the characteristic value of the region R2 may be extracted in relation to both right wheels, and the characteristic value of the region R3 may be extracted in relation to both left wheels. Further, the characteristic value of either one of the region R2 and the region R3 may be extracted in relation to any one wheel, and the characteristic value of the other of the region R2 and the region R3 may be extracted in relation to the other three wheels. Further, the wheels in relation to which the characteristic values of the regions R2 and R3 are extracted may be reversed.

However, there are p-split roads in which a road surface friction coefficient μ is different between the right side and the left side of the vehicle. It is therefore advisable to extract either one of characteristic values of the regions R2 and R3 in relation to the two front wheels and the other of the characteristic values of the regions R2 and R3 in relation to the two rear wheels.

Further, the content of the sensing condition in the tire side device 1 of each wheel is not limited to the condition that makes it easy to determine the wet road or the frozen road, and other conditions may be set.

For example, other conditions may be set that make it easier to identify road surfaces other than the wet road and the frozen road. It is known that a condition by which the characteristic level of a specific road surface becomes high differs from road surface to road surface. Therefore, the sensing condition may be set in accordance with such a known condition so that different road surfaces may be determined easily by the tire side devices 1. Although the region R2 is taken as an example of the wet road and the region R3 is taken as an example of the frozen road, these are merely exemplary. For example, the wet road may be a specific region which includes the timing at which the device mounting position touches the ground, and the frozen road may be a specific region which includes at least a part of the period in which the device mounting position touches the ground.

Further, the sensing may be performed in detail only in a predetermined region such as the regions R2 and R3 while sensing the whole regions without limiting the sensing to only the predetermined region. For example, the sensing frequency may be made variable such that the sensing frequency may be increased in a specific area, and the sensing frequency may be decreased in other areas. Even in this case, the calculation of the characteristic value can be simplified as compared with a case where the detailed sensing is performed for all the regions.

Further, instead of making it easy to determine a specific road surface, the frequency range for extracting the characteristic value of the detection signal of the vibration sensor unit 10 may be made different for each tire side device 1. For example, at least one tire side device 1 of the four wheels may extract the characteristic value for a low frequency band lower than a predetermined frequency of the detection signal. In the remaining tire side devices 1, the characteristic value may be extracted for a higher frequency band higher than the predetermined frequency in the detection signal. As an example, the tire side device 1 of each front wheel may extract the characteristic value in the frequency band of 0 kHz to 2 kHz of the detection signal, and the tire side device 1 of each rear wheel may extract the characteristic value in the frequency band of 2 kHz to 5 kHz of the detection signal.

The method of calculating the degree of similarity in this case is the same as the method of calculating the degree of similarity in the region R2 described in the first embodiment. For example, the degree of similarity may be determined by calculating a distance between the characteristic value of a predetermined frequency band in the equation 5 and a characteristic value corresponding to the predetermined frequency band extracted from all the support vectors of each type of road surfaces.

Further, as the sensing condition, the timing of sensing may be made different among the tire side devices 1. For example, at least one tire side device 1 of the four wheels may extract the characteristic value in a low vehicle speed range of a predetermined vehicle speed, for example, 80 km/h or less, and other tire side devices 1 may extract the characteristic value in a high vehicle speed range exceeding the predetermined vehicle speed. In addition to this, since the tire vibration is greater in the high vehicle speed range than in the low vehicle speed range, it is possible to change the vertical resolution of the detection signal acquired by the waveform processing unit 11c. The vertical resolution is a range of A/D conversion of the detection signal performed by the waveform processing unit 11c, that is, an acceleration value per 1 LSB (hereinafter referred to as a minimum detection G value). The vertical resolution is set higher, that is, the minimum detection G value is made larger, as the vehicle speed increases. Since the vibration due to the unevenness of the road surface becomes higher and the vibration waveform appearing in the detection signal becomes larger as the vehicle speed increases, the minimum detection G value is preferably increased in correspondence to the magnitude of the vibration waveform.

The vehicle speed is calculated by calculating the time required for one rotation of the tire 3 from the detection signal of the vibration sensor unit 10 and then multiplying the circumference length of the tire 3. The time required for one rotation of the tire 3 is calculated from the time between successively generated first peaks or the successively generated second peaks of the time axis waveform of the detection signal of the vibration sensor unit 10.

Second Embodiment

A second embodiment will be described next. In the present embodiment, the sensing condition is set by the vehicle body side system 2 instead of the tool 200 in the first embodiment. The other configurations are the same as those in the first embodiment, and hence only difference from the first embodiment will be described.

Figure 8:
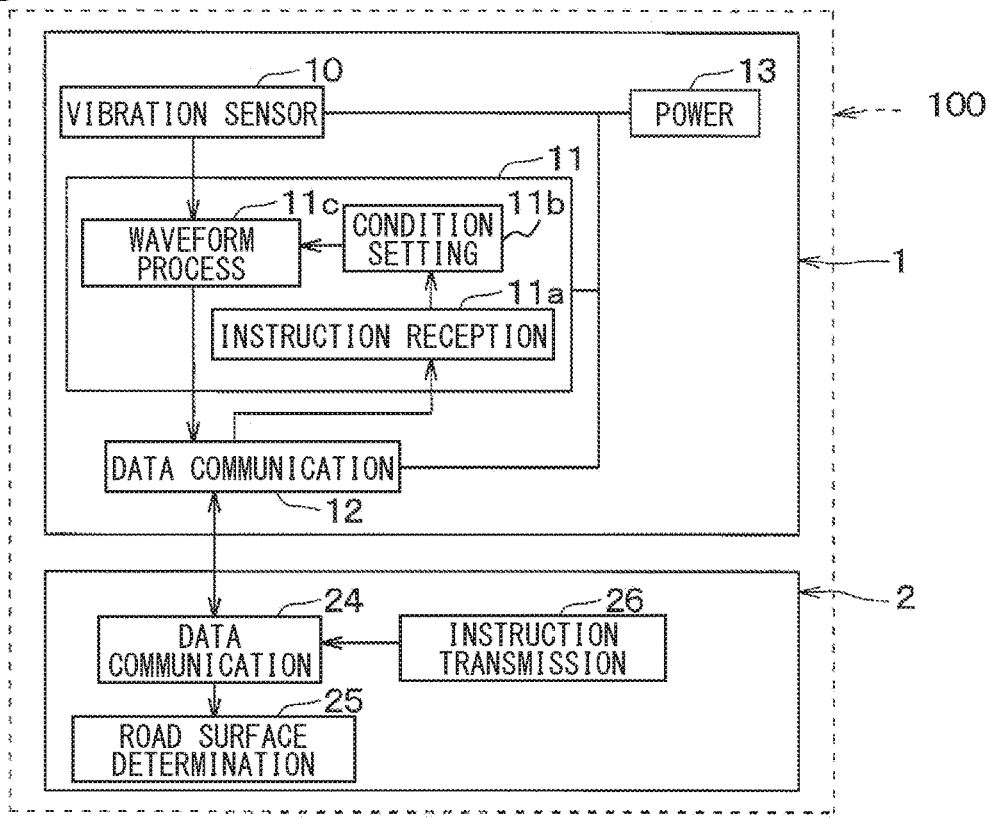
FIG. 8 is a block diagram showing respective details of each tire side device and a vehicle body side system provided in a tire system according to a second embodiment.

As shown in FIG. 8, in the present embodiment, an instruction transmission unit 26 is provided in the receiver 21 of the vehicle body side system 2. The instruction transmission unit 26 is configured to transmit an instruction signal indicating the sensing condition to each tire side device 1 instead of the tool 200 described in the first embodiment. The instruction signal indicating the sensing condition is the same as the instruction signal transmitted by the tool 200.

The instruction transmission unit 26 stores the sensing condition for the tire side device 1 for each wheel in advance, or stores the sensing condition input by a driver or a vehicle mechanic through an operation unit (not shown). Then, the instruction transmission unit 26 is configured to cause the data communication unit 24 to transmit the instruction signal including the stored sensing condition. For example, the instruction signal is transmitted, when a driver or a maintenance person inputs the sensing condition through an operation unit or at a predetermined timing according to a program stored in advance, for example, immediately after an ignition switch is turned on.

As described above, the vehicle body side system 2 is provided with the instruction transmission unit 26 so that the instruction transmission unit 26 outputs the instruction signal including the sensing condition to each tire side device 1. Thus the present embodiment also provides the same effect as the first embodiment.

Third Embodiment

A third embodiment will be described next. The present embodiment is different from the first embodiment in that a weight detection function is added and the sensing condition is changed. The other configurations are the same as those in the first embodiment and hence only differences from the first embodiment will be described.

Figure 9:
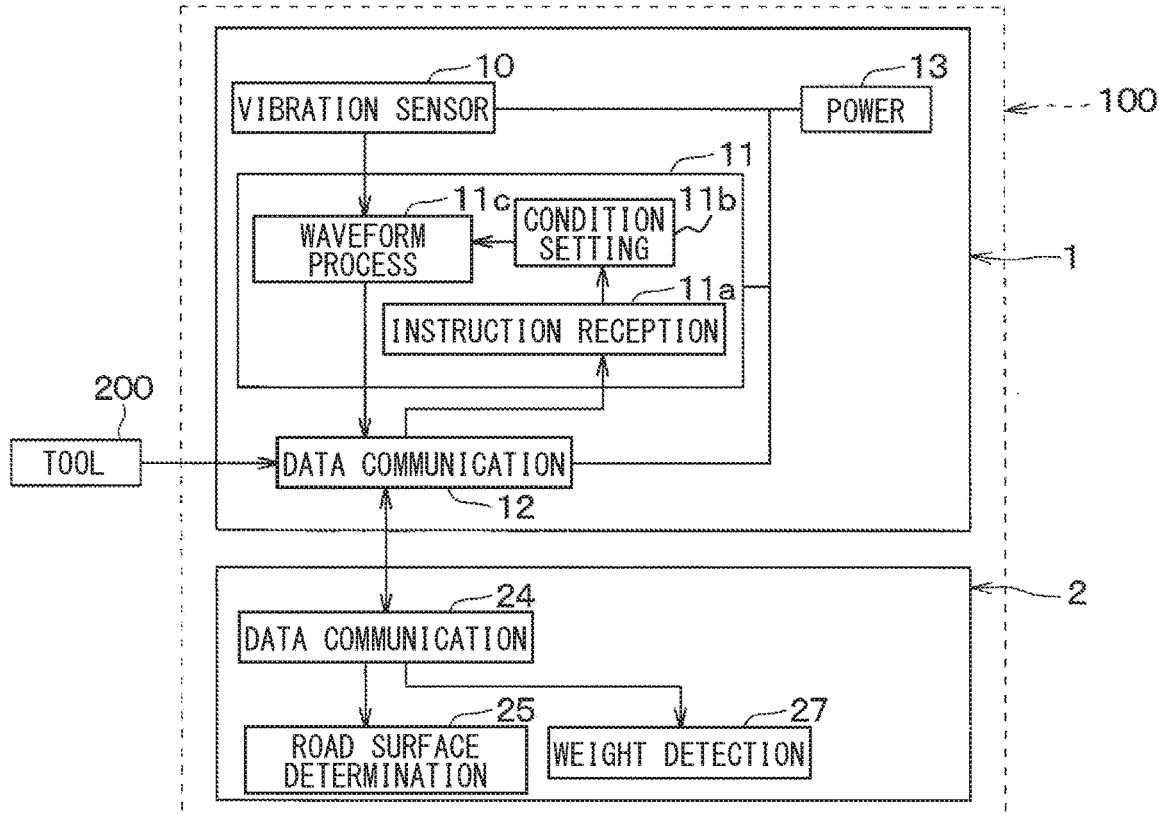
FIG. 9 is a block diagram showing respective details of each tire side device and a vehicle body side system provided in a tire system according to a third embodiment.

As shown in FIG. 9, in the present embodiment, the receiver 21 is provided with a weight detection unit 27, and the tire system 100 not only determines the road surface condition but also detects a weight applied to each wheel.

Specifically, at least two tire side devices 1 out of the four wheels generate data related to weight (hereinafter referred to as weight-related data) used for weight detection, and the tire side devices 1 of the remaining wheels generate the road surface data. These two kinds of data are transmitted to the vehicle body side system 2. That is, the sensing condition is set to perform different functions among the four wheels such that the tire side device 1 for at least two wheels of the four wheels generates the data related to the weight to be used to detect a ground weight, and the remaining tire side devices 1 generate the road surface data. In case of the present embodiment, the sensing condition is set such that the tire side device 1 of each front wheel generates the weight data, the tire side device 1 of each rear wheel generates the road surface data, and the weight data and the road surface data are transmitted to the vehicle body-side system 2.

The tire side device 1 for each rear wheel generates the road surface data by using the detection signal of the vibration sensor unit 10 for one rotation of the tire described in the first embodiment. Alternatively, the tire side devices 1 of the rear wheels may share different functions between the right wheel and the left wheel. For example, the tire side device 1 for the right rear wheel may generate the road surface data by extracting the characteristic value of the region R2 in which the characteristic level of the wet road is high, and the tire side device 1 for the left rear wheel may generate the road surface data by extracting the characteristic value of the region R3 in which the characteristic level of the frozen road is high. Of course, in each of the tire side devices 1 for the rear wheels, as described in the modification of the first embodiment, the characteristic values in the low frequency band and the high frequency band of the detection signal may be extracted, or the characteristic values in the low vehicle speed range or the high vehicle speed range may be extracted.

In the tire side devices 1 for the front wheels, the control unit 11 causes the waveform processing unit 11c to extract the ground contact area of the device mounting position when the tire 3 rotates based on the time change of the output voltage of the vibration sensor unit 10. The ground contact area here means a region of the tire where the device mounting position is grounded on the road. Since each time the tire 3 makes one rotation, the ground contact region comes into contact with the ground once, the number of rotations of the tire 3 per unit time, that is, the rotation speed can be calculated from the time interval of the ground contact region. The waveform processing unit 11c transmits the extracted data regarding the ground contact region and the data regarding the rotation speed of the tire 3 to the data communication unit 12 as the weight-related data.

Regarding the weight, the ground contact area is calculated based on the time of the ground contact region included in the data regarding the weight and the time required for one rotation of the tire determined from the data regarding the rotation speed of the tire 3, and is calculated from the area ratio of the ground contact area of each wheel. In the case where the tire side devices 1 for both front wheels generate data regarding the weight as in the present embodiment, the receiver 21 detects the left and right ground contact weights based on the ground contact areas of the left and right front wheels in the weight detection unit 27. This makes it possible to detect the ratio or difference between the left and right ground contact weights of the vehicle, that is, a deviation of the left and right weights of the vehicle. When the ratio or difference between the left and right ground contact weights is greater than a predetermined threshold value, the driver is notified via the notification device 23.

Here, the sensing condition of the processing such as the calculation performed in the waveform processing unit 11c is different between the data regarding the weight and the road surface data. Therefore, by setting different sensing conditions in the tire side device 1 of each wheel, the tire side device 1 that generates the road surface data and the tire side device 1 that generates the data regarding weight can be divided. As a result, it is possible to save electric power as compared with the case where the tire side device 1 of each road wheel generates both of the road surface data and the weight data and transmits such data to the vehicle body side system 2.

Other Embodiment

Although the present disclosure is made with reference to the embodiments described above, the present disclosure is not limited to such embodiments but may include various changes and modifications which are within equivalent ranges. In addition, other combinations and configurations including only a single element, more or less, are also within the spirit and scope of the present disclosure.

(1) For example, the above embodiments are not unrelated to each other, and may be appropriately combined. As one example, the tire side devices 1 for both front wheels may extract the characteristic value of the region R2 where the characteristic value of the wet road is high and the characteristic value of the region R3 where the characteristic value of the frozen road is high as described in the first embodiment. Further, in each of the tire side devices 1 for both rear wheels, the characteristic values of the low frequency band and the high frequency band may be extracted from the detection signal as described in the second embodiment. In this way, the respective embodiments may be combined.

(2) Further, in each of the above embodiments, the vibration sensor unit 10 is formed of the acceleration sensor. However, the vibration sensor unit 10 may alternatively be formed of the other element capable of detecting vibration such as, e.g., a piezoelectric element.

(3) Further, in the above embodiments, the data including the characteristic value is used as the road surface data indicating the road surface condition appearing in the detection signal of the vibration sensor unit 10 of the tire side device 1. However, this is only one example, and other data may be used as the road surface data. For example, integrated value data of the vibration waveform of each of the five regions R1 to R5 included in the vibration data of one rotation of the tire 3 may be used as the road surface data, or raw data of the detection signal itself may be used as the road surface data.

(4) Also, in each of the above embodiments, the road surface determination unit 25 of the receiver 21 included in the vehicle body side system 2 determines the degree of similarity between the characteristic value and the support vector to determine the road surface condition.

However, this is also only one example. It is possible that any sections in the vehicle body side system 2, e.g., other ECU such as the brake ECU 22, may be configured to determine the degree of similarity, and determine the road surface condition. In addition, it is also possible to store the support vector in the tire side device 1 so that the tire side device 1 determines the road surface condition and transmits data indicating the determination result of the road surface condition to the vehicle body side system 2 as the road surface data.

(5) Further, the role sharing in each wheel described in each of the above embodiments does not necessarily have to be fixed, and the role sharing may be switched. For example, as described in the first embodiment, the tire side devices 1 of both of the front wheels are configured to extract the characteristic values of the region R2 in the detection signal of the vibration sensor unit 10, and the tire side devices 1 of both of the rear wheels are configured to extract the characteristic value of the region R3 in the detection signal of the vibration sensor unit 10 detection signal. These roles may be switched over when a specific condition is satisfied, for example, when there is an instruction from the tool 200 or the instruction transmission unit 26. After the switching over, the tire side devices 1 of both of the rear wheels extract the characteristic values of the region R2 of the detection signals of the vibration sensor units 10, and the tire side devices 1 of both of the front wheels extract the characteristic values of the regions R3 of the detection signals of the vibration sensor units 10. In this way, the sharing of roles may be switched.

(6) In the third embodiment, as the road surface condition determination device having the weight detection function, at least two tire side devices 1 out of the four wheels are configured to generate data regarding the weight, and other two tire side devices 1 of the remaining wheels are configured to generate the road surface data. On the other hand, the tire side devices 1 of all four wheels may be configured to generate the weight data and at least one of the tire side devices 1 of the four wheels may be configured to generate the road surface data. On the contrary, the tire side devices 1 of all four wheels may be configured to generate the road surface data and at least two of the tire side devices 1 of the four wheels may be configured to generate the weight data. That is, one of the road surface data and the weight data may be generated by all the tire side devices 1 of four wheels and the other of the road surface data and the weight data may be generated by only a part of the tire side devices 1 of the four wheels.

In this case, one of the data regarding the weight and the road surface condition is transmitted from all the tire side devices 1 of the four wheels. However, it still contributes to the reduction of power consumption as compared with the case where both data are transmitted from the tire side devices 1 of all the wheels. It should be noted that the data generated only by some of the tire side devices 1 need not be generated by the same tire side device 1, and it is preferable to switch over the tire side device 1 which generates such data among four wheels. This switching over makes it possible to equalize power consumption of the tire side devices 1 of the four wheels.

What is claimed is:

1. A road surface condition determination device comprising:
    a tire side device attached to each of a plurality of tires of a vehicle; and
    a vehicle body side system provided in a vehicle body, wherein:
    the tire side device includes a vibration detection unit configured to output a detection signal corresponding to a magnitude of vibration of the tire, a control unit configured to perform a sensing that generates road surface data indicating a road surface condition appearing in a waveform of the detection signal, and a first data communication unit configured to transmit the road surface data;
    the vehicle body side system includes a second data communication unit configured to receive the road surface data transmitted from the first data communication unit, and a road surface determination unit configured to determine a road surface condition of a traveling road surface of the vehicle based on the road surface data;
    the control unit of the tire side device of at least one of the plurality of tires and the control unit of the tire side device of at least another one of the plurality of tires are configured to perform the sensing based on different sensing conditions; and
    the first communication unit is configured to transmit the road surface data generated by the different sensing conditions.

2. The road surface condition determination device according to claim 1, wherein the control unit includes:
    an instruction reception unit configured to receive an instruction signal including the sensing condition transmitted from an external device;
    a condition setting unit configured to set the sensing condition to be followed by the control unit in sensing the detection signal based on the sensing condition included in the instruction signal received by the instruction reception unit; and a waveform processing unit configured to generate the road surface data by performing the sensing based on the sensing condition set by the condition setting unit.

3. The road surface condition determination device according to claim 1, wherein:

the vehicle body side system includes an instruction transmission unit configured to store the sensing condition and cause a transmission of the instruction signal including the sensing condition;

the second data communication unit is configured to perform bilateral communication with the first data communication unit; and the control unit includes an instruction reception unit configured to receive the instruction signal including the sensing condition, a condition setting unit configured to set the sensing condition to be followed in performing the sensing by the control unit based on the sensing condition included in the instruction signal received by the instruction reception unit, and a waveform processing unit configured to generate the road surface data based on the sensing condition set by the condition setting unit.

4. The road surface condition determination device according to claim 2, wherein:

the waveform processing unit is configured to extract a characteristic value of a tire vibration from the detection signal and generate the road surface data including the characteristic value;

the waveform processing unit in the tire side device of the at least one of the plurality of tires is configured to extract a characteristic value in one specific region of the detection signal in one rotation of the tire and generate the road surface data including the characteristic value of the specific region; and the waveform processing unit in the tire side device of the at least another one of the plurality of tires is configured to extract a characteristic value in another specific region different from the one specific region of the detection signal in one rotation of the tire and generate the road surface data including the characteristic value of the another specific region.

5. The road surface condition determination device according to claim 4, wherein:

the one specific region includes a timing of starting a contact of a device mounting position, where the tire side device is attached, with a ground surface; and the another specific region includes at least a part of time period during which the device mounting position keeps contacting the ground surface.

6. The road surface condition determination device according to claim 2, wherein:

the waveform processing unit is configured to extract a characteristic value of a tire vibration from the detection signal and generate the road surface data including the characteristic value;

the waveform processing unit in the tire side device of the at least one of the plurality of tires is configured to extract a characteristic value of a low frequency band lower than a predetermined frequency in the detection signal in one rotation of the tire and generate the road surface data including the characteristic value of the low frequency band; and the waveform processing unit in the tire side device of the at least another one of the plurality of tires is configured to extract a characteristic value of a high frequency band higher than the predetermined frequency in the detection signal in one rotation of the tire and generate the road surface data including the characteristic value of the high frequency band.

7. The road surface condition determination device according to claim 2, wherein:

the waveform processing unit is configured to extract a characteristic value of a tire vibration from the detection signal;

the waveform processing unit in the tire side device of the at least one of the plurality of tires is configured to extract the characteristic value from the detection signal in one rotation of the tire in a low vehicle speed region lower than a predetermined vehicle speed and generate the road surface data including the characteristic value in the low vehicle speed region; and the waveform processing unit in the tire side device of the at least another one of the plurality of tires is configured to extract the characteristic value from the detection signal in one rotation of the tire in a high vehicle speed region higher than the predetermined vehicle speed and generate the road surface data including the characteristic value in the high vehicle speed region.

8. The road surface condition determination device according to claim 3, wherein:

the waveform processing unit is configured to extract a characteristic value of a tire vibration from the detection signal and generate the road surface data including the characteristic value;

the waveform processing unit in the tire side device of the at least one of the plurality of tires is configured to extract a characteristic value in one specific region of the detection signal in one rotation of the tire and generate the road surface data including the characteristic value of the specific region; and the waveform processing unit in the tire side device of the at least another one of the plurality of tires is configured to extract a characteristic value in another specific region different from the one specific region of the detection signal in one rotation of the tire and generate the road surface data including the characteristic value of the another specific region.

9. The road surface condition determination device according to claim 8, wherein:

the one specific region includes a timing of starting a contact of a device mounting position, where the tire side device is attached, with a ground surface; and the another specific region includes at least a part of time period during which the device mounting position keeps contacting the ground surface.

10. The road surface condition determination device according to claim 3, wherein:

the waveform processing unit is configured to extract a characteristic value of a tire vibration from the detection signal and generate the road surface data including the characteristic value;

the waveform processing unit in the tire side device of the at least one of the plurality of tires is configured to extract a characteristic value of a low frequency band lower than a predetermined frequency in the detection signal in one rotation of the tire and generate the road surface data including the characteristic value of the low frequency band; and the waveform processing unit in the tire side device of the at least another one of the plurality of tires is configured to extract a characteristic value of a high frequency band higher than the predetermined frequency in the detection signal in one rotation of the tire and generate the road surface data including the characteristic value of the high frequency band.

11. The road surface condition determination device according to claim 3, wherein:
the waveform processing unit is configured to extract a characteristic value of a tire vibration from the detection signal;
the waveform processing unit in the tire side device of the at least one of the plurality of tires is configured to extract the characteristic value from the detection signal in one rotation of the tire in a low vehicle speed region lower than a predetermined vehicle speed and generate the road surface data including the characteristic value in the low vehicle speed region; and
the waveform processing unit in the tire side device of the at least another one of the plurality of tires is configured to extract the characteristic value from the detection signal in one rotation of the tire in a high vehicle speed region higher than the predetermined vehicle speed and generate the road surface data including the characteristic value in the high vehicle speed region.

12. A road surface condition determination device comprising a tire side device attached to each of a plurality of tires of a vehicle, and a vehicle body side system provided in a vehicle body, the road surface condition determination device having, in addition to a road surface condition determination, a weight detection function for detecting a weight applied to a wheel to which the tire is attached, wherein:
the tire side device includes a vibration detection unit configured to output a detection signal corresponding to a magnitude of vibration of the tire, a control unit configured to perform a sensing that generates road surface data indicating a road surface condition appearing in a waveform of the detection signal or weight-related data related to the weight, and a first data communication unit configured to transmit the road surface data or the weight-related data;
the vehicle body side system includes a second data communication unit configured to receive the road surface data or the weight-related data transmitted from the first data communication unit, a road surface determination unit configured to determine a road surface condition of a traveling road surface of the vehicle based on the road surface data, a weight detection unit configured to detect the weight based on the road-related data; and
the control unit of the tire side device of at least one of the plurality of tires and the control unit of the tire side device of at least another one of the plurality of tires are configured to perform the sensing by different sensing conditions and generate the weight-related data and the road surface data, respectively.

13. A road surface condition determination device comprising a tire side device attached to each of a plurality of tires of a vehicle, and a vehicle body side system provided in a vehicle body, the road surface condition determination device having, in addition to a road surface condition determination, a weight detection function for detecting a weight applied to a wheel to which the tire is attached, wherein:
the tire side device includes a vibration detection unit configured to output a detection signal corresponding to a magnitude of vibration of the tire, a control unit configured to perform a sensing that generates at least one of road surface data indicating a road surface condition appearing in a waveform of the detection signal and weight-related data related to the weight, and a first data communication unit configured to transmit the road surface data or the weight-related data;
the vehicle body side system includes a second data communication unit configured to receive the road surface data and the weight-related data transmitted from the first data communication unit, a road surface determination unit configured to determine a road surface condition of a traveling road surface of the vehicle based on the road surface data, a weight detection unit configured to detect the weight based on the weight-related data; and
the control unit of the tire side device of each of the plurality of tires generates one of the road surface data and the weight-related data, and the control unit of the tire side device of only a part of the plurality of tires generates an other of the weight-related data and the road surface data.

\* \* \* \* \*